Oct. 11, 1966  F. H. GROOMS  3,278,777
BRUSH LIFTING DEVICE FOR DYNAMOELECTRIC MACHINES
Filed May 25, 1964

Inventor
Franklin H. Grooms
By Robert B. Benson
Attorney

United States Patent Office 3,278,777
Patented Oct. 11, 1966

3,278,777
BRUSH LIFTING DEVICE FOR DYNAMO-
ELECTRIC MACHINES
Franklin H. Grooms, Cincinnati, Ohio, assignor to Allis-
Chalmers Manufacturing Company, Milwaukee, Wis.
Filed May 25, 1964, Ser. No. 369,897
6 Claims. (Cl. 310—240)

This invention relates generally to dynamoelectric machines. More specifically, this invention relates to a device for simultaneously lifting the brushes from the commutator of a D.C. motor.

Many attempts have been made in the motor industry to provide a simple, economic apparatus for simultaneously lifting the brushes from the commutator of a D.C. motor. However, most of these devices involve somewhat complex mechanical arrangements which are expensive to build and require considerable maintenance. Some electromechanical lifting devices have been attempted but frequently these devices were unreliable and had different reaction characteristics for each brush which resulted, in many instances, in preventing a simultaneous lifting of the brushes from the commutator. This was particularly true in the brush lifting devices which utilize a different solenoid for each brush.

The brush lifting device of this invention overcomes the problems mentioned above by utilizing a single solenoid for simultaneously lifting all of the brushes on the commutator of the motor. Specifically, each brush is connected to a cable which in turn is connected to the moving element of the solenoid. These cables are adjusted so that they will lift all of the brushes off the commutator simultaneously in response to the movement of the single movable element of the solenoid. This arrangement is extremely simple and inexpensive to manufacture. Furthermore, since there are few movable parts, the reliability of this unit is extremely high and the maintenance very low.

Therefore, it is the object of this invention to provide a new and improved brush lifting device for a dynamoelectric machine.

Another object of this invention is to provide a new and improved brush lifting device for dynamoelectric machines which will simultaneously lift the brushes of the commutator.

Another object of this invention is to provide a new and improved brush lifting device for dynamoelectric machines which has high reliability and low maintenance and initial cost.

Figure 2:
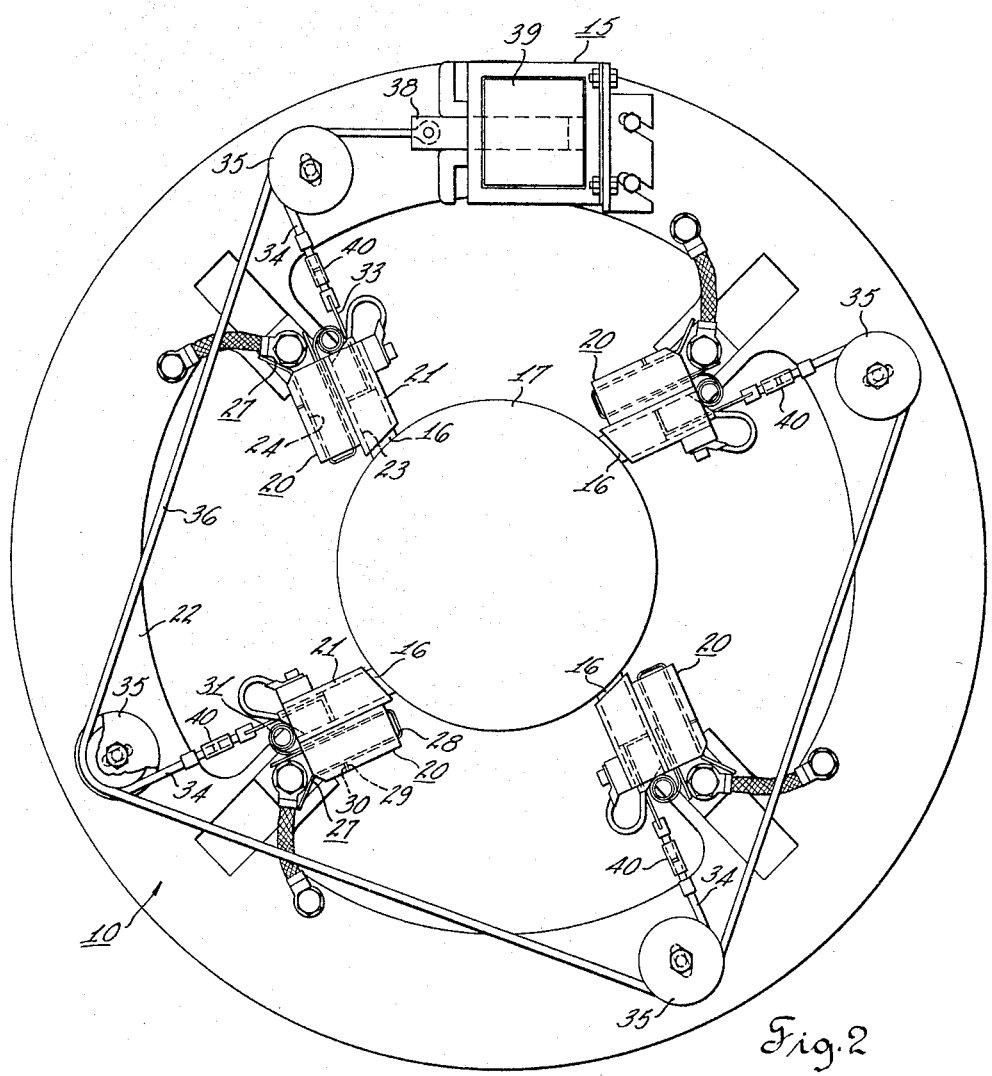
Figure 1:
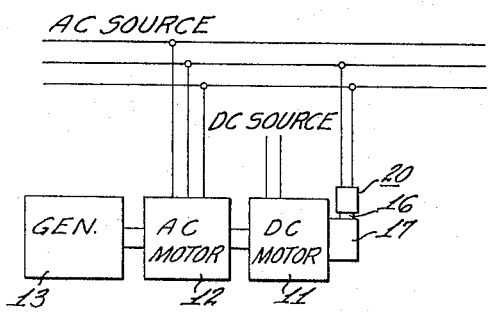

Other objects and advantages of this invention will be apparent from the following description when read in connection with the accompanying drawings, in which:

FIG. 1 is a schematic view illustrating uninterrupted power supply having a D.C. motor utilizing the brush lifting arrangement of this invention, and FIG. 2 is an enlarged end view of the commutator of the D.C. motor of FIG. 1 illustrating the brush lifting mechanism.

Referring more specifically to the drawing by characters of reference, the invention is illustrated in the brush rigging 10 of a direct current motor 11. In the illustrated embodiment, the direct current motor 11 is connected to an A.C. motor 12 which in turn drives an A.C. generator 13 and forms a part of an uninterrupted power system. As shown schematically, the A.C. motor 12 is driven from a source of A.C. current. The D.C. motor 11 is adapted to be connected to an appropriate source of direct current When the A.C. current fails, the solenoid 15 of the brush rigging 10 is deenergized and the D.C. motor automatically takes over to drive the generator through the rotor of the A.C. motor.

The brush rigging or assembly 10 has a solenoid 15 for controlling the position of the brushes 16 on the commutator 17 of the D.C. motor. The solenoid 15 can be connected to the same A.C. source as that to which the A.C. motor is connected so that upon failure of the A.C. source, the solenoid is instantly deenergized allowing the brushes 16 to automatically engage the commutator 17 of the D.C. motor to energize the motor so that it can drive the generator 13.

The brush holders 20 of the illustrated brush rigging can be of any suitable construction, but in the illustrated embodiment they comprise a housing member 21 attached to a rocker ring 22 and having a pair of longitudinal slots 23, 24 formed therein. A carbon brush 16 of the type commonly used in dynamoelectric machines is positioned in one of the slots 23 in longitudinal sliding relation to the holder and extends inwardly to engage the commutator 17. A constant tension spring assembly 27 is mounted in the other of the slot 24 and engages the brush 16 to hold it in contact with the commutator. The constant tension spring assembly 27 comprises generally a U-shaped clip member 28 that fits into the slot 24 and has a projection 29 extending therefrom that fits into a corresponding hole 30 in the housing to hold the clip in place. A coil spring 31 of relatively flat, thin material is attached to the lower external surface of the spring clip 28 and extends into the slot 23 into which the brush is positioned. The spring 31 engages the upper portion of the brush and exerts a constant force radially inward on the brush.

Appropriate means are attached to each brush 16 for lifting it off the commutator. Specifically, a linkage 33 of electrical insulating material is connected to the brush and to a cable 34 that extends radially outward from the brush and around a guide or pulley 35. This cable 34, called a feeder or secondary cable, is in turn connected to a main cable 36 which extends around the pulleys associated with each of the brushes and is connected at its free end to the movable element 38 of the solenoid 15. When the solenoid is energized, the movable element 38 is pulled within the solenoid coil 39 and hence exerts a force on the cable and pulls or lifts the brushes radially outward out of contact with the commutator. When the solenoid is deenergized, such as when it loses its power from the A.C. source, the springs 31 take over and force the brushes radially inward into contact with the commutator. As the brushes move inwardly they pull the cables 34, 36 and the movable element 38 slides partially out of the solenoid coil 39. The brushes 20 then remain in this engaged position until the solenoid is reenergized, such as when the A.C. power returns. When the solenoid is energized the movable element 38 is snapped back into the solenoid coil 39 and it pulls the cables 34, 36 which in turn pull the brushes out of contact with the commutator.

A suitable adjusting device 40 can be used with each of the secondary cables 34 to accurately position each brush and thereby assure simultaneous lifting of the brushes 16. Such an adjusting mechanism would be necessary only in special application where exact simultaneous lifting of the brushes is extremely critical.

Although but one embodiment of this invention has been illustrated and described, it will be apparent to those skilled in the art that various modifications and changes can be made therein without departing from the scope of the appended claims or from the spirit of the invention.

Having now particularly described and ascertained the nature of my said invention and the manner in which it is to be performed, I declare that what I claim is:

1. A brush holder assembly for a dynamoelectric machine having a commutator and a rocker ring, said assembly comprising: a plurality of arcuately spaced brush holder housings mounted on said rocker ring, said housings having a pair of adjacent channels, a carbon brush slidably positioned in one of said channels of each of said housings, resilient means positioned in the other of said channels and engaging said brushes for urging said brushes inwardly, cable means connected to said brushes, guide means connected to said rocker ring and positioned radially outward from each of said brushes, a solenoid having a movable element, means for energizing said solenoid to pull said movable element into said solenoid, said cables extending past said guide means and being connected to said movable element whereby upon energizing said solenoid said brushes are lifted radially outward and out of contact with said commutator.

2. The brush holder assembly of claim 1 in which said resilient means is a constant tension spring.

3. A brush holder assembly for a dynamoelectric machine having a commutator and a rocker ring; said assembly comprising: a plurality of arcuately spaced brush holder housings mounted on said rocker ring, said housings having a pair of adjacent channels, a carbon brush slidably positioned in one of said channels of each of said housings, resilient means positioned in the other of said channels and engaging said brushes for urging said brushes inwardly, cable means connected to said brushes, pulleys connected to said rocker ring and positioned radially outward from each of said brushes, a solenoid having a movable element, means for energizing said solenoid to pull said movable element into said solenoid, said cables extending past said pulleys and being connected to said movable element whereby upon energizing said solenoid said brushes are lifted radially outward and out of contact with said commutator.

4. A brush holder assembly for a dynamoelectric machine having a commutator and a rocker ring; said assembly comprising a plurality of arcuately spaced brush holder housings mounted on said rocker ring, said housings having a pair of adjacent channels, a carbon brush slidably positioned in one of said channels of each of said housings, resilient means positioned in the other of said channels and engaging said brushes for urging said brushes inwardly, electrical insulating straps attached to said brushes, cables attached to said straps, guide means connected to said rocker ring and positioned radially outward from each of said brushes, a solenoid having a movable element, means for energizing said solenoid to pull said movable element into said solenoid, said cables extending past said guide means and being connected to said movable element whereby upon energizing said solenoid said brushes are lifted radially outward and out of contact with said commutator.

5. The brush holder assembly of claim 3 having an adjusting device between each of said straps and its associated said cable to independently vary the position of each said brushes relative to said movable element.

6. A brush holder assembly for a dynamoelectric machine having a commutator and a rocker ring; said assembly comprising a plurality of arcuately spaced brush holder housings mounted on said rocker ring, said housings having a pair of adjacent channels, a carbon brush slidably positioned in one of said channels of each of said housings, resilient means positioned in the other of said channels and engaging said brushes for urging said brushes inwardly, secondary cable means connected to said brushes, guide means connected to said rocker ring and positioned radially outward from each of said brushes, a solenoid having a movable element, means for energizing said solenoid to pull said movable element into said solenoid, said secondary cable means extending outward to said guide means, a primary cable extending past said guide means and being attached to each of said secondary cables and to said movable element whereby upon energizing of said solenoid said brushes are lifted radially outward and out of contact with said commutator.

References Cited by the Examiner

UNITED STATES PATENTS

| 575,918 | 1/1897 | Wheeler | 310—240 |
| 1,228,710 | 6/1917 | Steen | 310—240 |
| 1,276,727 | 8/1918 | Creveling | 310—230 |
| 2,324,156 | 7/1943 | Heintz et al. | 310—240 |
| 2,377,260 | 5/1945 | Nardone | 310—240 |
| 2,495,430 | 1/1950 | Stroburg | 310—240 |

MILTON O. HIRSHFIELD, *Primary Examiner.*

D. F. DUGGAN, *Assistant Examiner.*